US010897500B2

(12) United States Patent
Nanduri et al.

(10) Patent No.: US 10,897,500 B2
(45) Date of Patent: Jan. 19, 2021

(54) SYNCHRONIZING A DEVICE USING PUSH NOTIFICATIONS

(71) Applicant: International Business Machines Corporation, Armonk, NY (US)

(72) Inventors: Srinivasan Nanduri, West Godavari District (IN); Girish Dhanakshirur, Bangalore (IN); Anoop G. M. Ramachandra, Mysore (IN); Norton Samuel A. Stanley, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/150,807

(22) Filed: Oct. 3, 2018

(65) Prior Publication Data
US 2020/0112606 A1    Apr. 9, 2020

(51) Int. Cl.
*H04L 29/08*    (2006.01)
*G06F 16/27*    (2019.01)

(52) U.S. Cl.
CPC .......... *H04L 67/1095* (2013.01); *G06F 16/27* (2019.01); *H04L 67/26* (2013.01); *H04L 69/329* (2013.01)

(58) Field of Classification Search
CPC ........ H04W 56/00; G06F 16/00; G06F 16/95; H04L 51/10
USPC ........................................................ 709/217
See application file for complete search history.

(56) References Cited

U.S. PATENT DOCUMENTS

| | | | | |
|---|---|---|---|---|
| 2009/0307715 A1* | 12/2009 | Santamaria | ........... | G06F 9/4418 719/318 |
| 2013/0047034 A1* | 2/2013 | Salomon | ................ | H04W 4/00 714/18 |
| 2013/0190032 A1* | 7/2013 | Li | .......................... | H04L 67/28 455/517 |

(Continued)

FOREIGN PATENT DOCUMENTS

CN    101895842    8/2010

OTHER PUBLICATIONS

"Push Notifications in Hybrid Applications" (Online) retrieved from the Internet on Sep. 4, 2018 at URL>https://mobilefirstplafform.ibmcloud.com/tutorials/en/foundation/6.3/notifications/push-notifications-hybrid-applications/, IBM Mobile Foundation Developer Center, Total 15 pages.

(Continued)

*Primary Examiner* — Mahran Y Abu Roumi
(74) *Attorney, Agent, or Firm* — Janaki K. Davda; Konrad, Raynes, Davda and Victor LLP

(57) ABSTRACT

Provided are techniques for synchronizing a device using push notifications. For each of a plurality of messages, a message record is created in a table of a database with a message create time for a message, a device identifier of a device to receive the message, an application identifier of an application on the device to receive the message, message content of the message, and an indicator to indicate whether the message has been picked up by the device. A message is selected from the plurality of messages. It is determined that a message retry count for the message has not been met and the message has not been picked up by the device. It is determined that it is time to retry sending a silent push (Continued)

notification based on a retry interval. The silent push notification is sent to the application on the device to wake up the application.

15 Claims, 7 Drawing Sheets

(56) References Cited

U.S. PATENT DOCUMENTS

| | | | |
|---|---|---|---|
| 2015/0282117 A1 | 10/2015 | Serna Pozuelo et al. | |
| 2015/0351075 A1 | 12/2015 | Korver et al. | |
| 2018/0124195 A1* | 5/2018 | Bell | H04L 67/26 |
| 2019/0246276 A1* | 8/2019 | Lingala | H04L 63/107 |
| 2019/0251198 A1* | 8/2019 | Shamsutdinov | G06F 16/27 |
| 2019/0281002 A1* | 9/2019 | Jhaveri | H04L 51/22 |

OTHER PUBLICATIONS

"The Database that Syncs!" (online) retrieved from the Internet on Sep. 5, 2018 at URL>https://pouchdb.com/, Total 3 pages.

Wikipeida, "Apache Couch DB", (online) retrieved on Sep. 4, 2018 from the internet at URL>https://en.wikipedia.org/wiki/Apache_CouchDB, Total 7 pages.

Wikipeida, "Push Technology", (online) retrieved on Sep. 4, 2018 from the internet at URL>https://en.wikipedia.org/wiki/Push_technology, Total 6 pages.

Mell et al., "Effectively and Securely Using the Cloud Computing Paradigm" dated Oct. 7, 2009, NIST, Information Technology Laboratory, Total 80 pages.

Mell et al., "The NIST Definition of Cloud Computing" dated Sep. 2011, Recommendations of the National Institute of Standards and Technology, Total 7 pages.

"Introduction to Push Notifications", Source: Progressive Web Apps Training, Apr. 9, 2018, available from the Internet at URL>https://developers.google.com/web/ilt/pwa/introduction-to-push-notifications, Total 35 pages.

"Everything You Need to Build Scalable Realtime Apps." (online) retrieved from the Internet on Oct. 1, 2018 at URL>https://pushercom/features, Total 4 pages.

"Lightning-fast. Highly-Reliable Push Notification Delivery", (online) retrieved from the Internet on Oct. 1, 2018 at URL>•https://pushy.me/, Total 9 pages.

"Are Android Push Notifications Reliable? [Closed]", (online) retrieved from the Internet on Oct. 1, 2018 at URL>https://stackoverflow.com/questions/27967691/are-android-push-notifications-reliable, Total 1 page.

"Superior Push Notifications" (online) retrieved from the Internet on Oct. 1, 2018 at URL>http://www.catapush.com, Total 6 pages.

\* cited by examiner

SYNCHRONIZING A DEVICE USING PUSH NOTIFICATIONS

BACKGROUND

1. Field of the Invention

Embodiments of the invention relate to synchronizing a device using push notifications.

2. Description of the Related Art

A unified push notification may be described as a mechanism for pushing messages from a first device (e.g., a server), to an application on a second device (e.g., a mobile device). Notifications are received by the second device regardless of whether the application is currently running.

In some conventional systems, a device registers for push notifications from a push service. A backend application issues a push notification to the push services for the device. The push service sends the push notification (e.g., via a cloud infrastructure) to the device, whether or not the device or the application to receive the notification is available (i.e., online)

One vendor's unified push notification mechanism may use vendor infrastructure from other vendors to send notifications to respective devices. The unified push notification mechanism makes the process of communicating with users and devices transparent to the developer.

In computer and telecommunication networks, Quality of Service (QoS) may refer to a specified requirement for a certain performance level or ability and may also refer to the performance ability, itself, such as an ability to provide specified priorities, which may include respective priorities for respective applications, users or data flows, for example. QoS may include, for example, a performance level defined in terms of bit rate, delay, delay variation, packet loss or bit error rate. Real-time services via network, such as voice over IP, cellular data communication, multimedia streaming, etc., tend to be delay sensitive. Consequently, QoS is particularly important in these applications.

Vendor services may have their own QoS standards for sending the push notifications to the devices. This is relevant in push notifications as the device receiving the notification may be offline/unavailable when the vendor service tries to push the notification.

For instance, in some conventional push notification mechanisms, one recent notification for a particular application is stored. If multiple notifications are sent while the device is offline, each new notification causes the prior notification to be discarded. If the notifications are discarded, neither the application users nor an enterprise sending the push notification using the push service will know about the lost message.

In some other conventional push notification mechanisms, the notification is pushed and forgotten, even though the device was offline and did not receive the notification.

SUMMARY

In accordance with embodiments, a computer-implemented method is provided for synchronizing a device using push notifications. For each of a plurality of messages, a message record is created in a table of a database with a message create time for a message, a device identifier (ID) of a device to receive the message, an application identifier (ID) of an application on the device to receive the message, message content of the message, and an indicator to indicate whether the message has been picked up by the device. A message is selected from the plurality of messages. It is determined that a message retry count for the message has not been met and the message has not been picked up by the device. It is determined that it is time to retry sending a silent push notification based on a retry interval. The silent push notification is sent to the application on the device to wake up the application.

In accordance with other embodiments, a computer program product is provided for synchronizing a device using push notifications. The computer program product comprising a computer readable storage medium having program code embodied therewith, the program code executable by at least one processor to perform operations. For each of a plurality of messages, a message record is created in a table of a database with a message create time for a message, a device identifier (ID) of a device to receive the message, an application identifier (ID) of an application on the device to receive the message, message content of the message, and an indicator to indicate whether the message has been picked up by the device. A message is selected from the plurality of messages. It is determined that a message retry count for the message has not been met and the message has not been picked up by the device. It is determined that it is time to retry sending a silent push notification based on a retry interval. The silent push notification is sent to the application on the device to wake up the application.

In yet other embodiments, a computer system is provided for synchronizing a device using push notifications. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. For each of a plurality of messages, a message record is created in a table of a database with a message create time for a message, a device identifier (ID) of a device to receive the message, an application identifier (ID) of an application on the device to receive the message, message content of the message, and an indicator to indicate whether the message has been picked up by the device. A message is selected from the plurality of messages. It is determined that a message retry count for the message has not been met and the message has not been picked up by the device. It is determined that it is time to retry sending a silent push notification based on a retry interval. The silent push notification is sent to the application on the device to wake up the application.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Enterprises tend to be reluctant to use unified push notifications for some use cases, particularly when the enterprises perceive them as unreliable. For instance, in a banking scenario, push notifications are not used in case of Automatic Teller Machine (ATM) withdrawals to notify customers about balance. Instead, Short Message Service (SMS) (e.g., text messages) notifications may be favored over push notifications even when enterprises prefer to avoid the high costs incurred for SMS notifications. Also, airlines are reluctant to use push notifications, as there may be possibilities of customers missing flights due to loss of notifications.

Embodiments of the present invention provide QoS ability for push notifications. Embodiments synchronize devices using push notifications. In certain embodiments, the push notifications are unified push notifications. Unified push notifications may be described as framework for sending push notifications using a push service. The notifications may be described as text sent to an application (e.g., on a mobile device).

Figure 1:
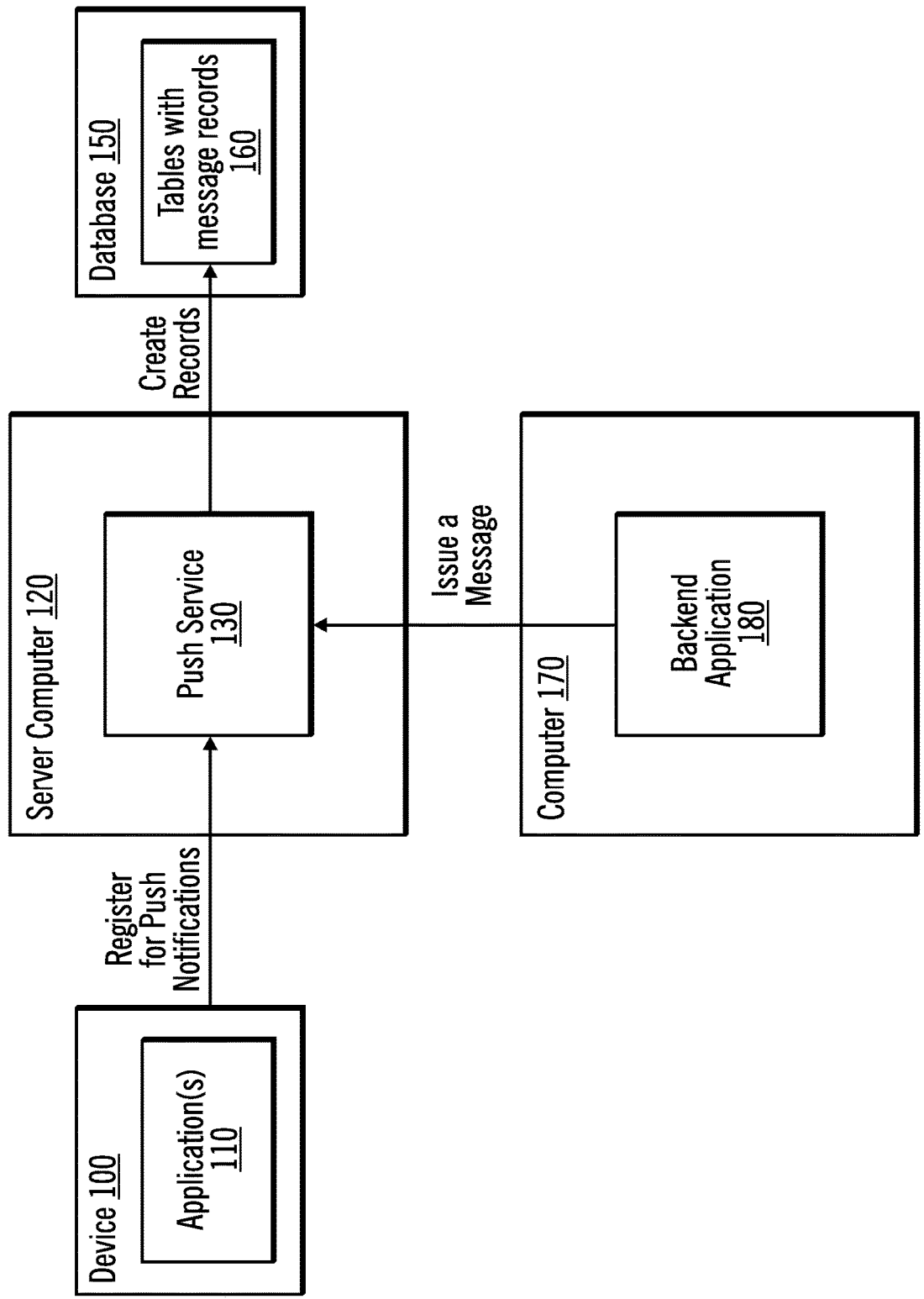
FIG. 1 illustrates, in a block diagram, a computing environment in accordance with certain embodiments.

FIG. 1 illustrates, in a block diagram, a computing environment in accordance with certain embodiments. A device 100 stores one or more applications 110. A server computer 120 includes a push service 130. The device 100 registers for push notifications with the push service 130. A backend application 180 at a computer 170.

issues a message for the device 100 to the push service 130. The message may also be referred to as a notification message. The push service 130 storages a message record in a database 150, which has one or more tables 160 with message records.

In certain embodiments, the device 100 may be a smart phone, a tablet computer, etc. In certain embodiments, a message record includes a message create time for the message, a device identifier (ID) of the device 100 to receive the message, an application identifier (ID) of the application 110 on the device 100 to receive the message, the message content of the message, and an indicator to indicate whether the message has been picked up by the device 100.

In certain embodiments, when the application 110 on the device 100 is active (i.e., online), the messages are synced using an application to database synchronization protocol between the database 150 and the device 100. Such syncing allows the application 110 to receive messages. That is, the device 100 and the push service 130 communicate using an application to database synchronization protocol. In certain embodiments, the application to database synchronization protocol is a database sync/replication protocol using an Apache CouchDB® database or a pouch database. (Apache CouchDB is a registered trademark of the Apache Software Foundation in the United States and/or other countries.)

In certain embodiments, when the application 110 on the device 100 is not active (i.e., is inactive or offline), the push service 130 sends a silent push notification to wake-up the application 110 (i.e., make the application 110 active) and synchronize the messages using the application to database synchronization protocol for delivery of the messages. The silent push notification is based on a retry count and a retry interval configuration provided by the server computer 120. In certain embodiments, the silent push notification is an empty notification to wake up the application 110 without any payload.

In certain embodiments, there is no limitation of the message content being sent in the push notifications. Embodiments enable administrators to configure the retry count, the retry interval, and the number of messages stored when the device 100 is offline. The retry count may be described as a parameter that specifies a number of hours within which the message is to be delivered to the device 100. The retry interval may be described as a parameter that specifies a time interval before a next retry (of sending a silent push notification) in case the message is not delivered yet. The number of messages stored may be described as a parameter that specifies a maximum number of messages are stored in the database 150 in case the messages are not delivered yet.

Figure 2:
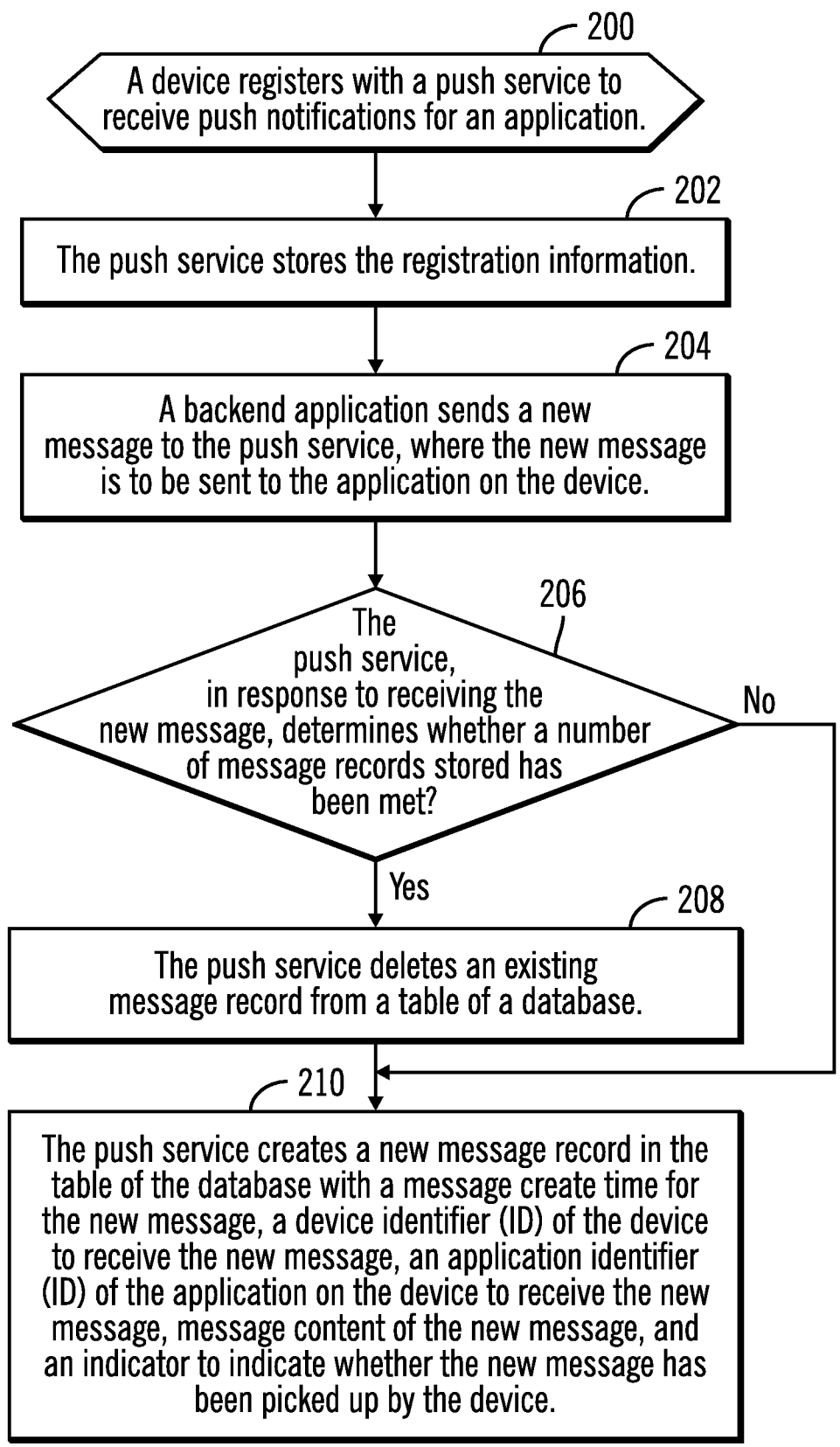
FIG. 2 illustrates, in a flowchart, operations for interactions of a device, a push service, and a backend application in accordance with certain embodiments.

FIG. 2 illustrates, in a flowchart, operations for interactions of the device 100, the push service 150, and the backend application 180 in accordance with certain embodiments. Control begins in block 200 with the device 100 registering with the push service 130 to receive push notifications for an application 110. In block 202, the push service 130 stores the registration information. In certain embodiments, the registration information that is stored includes a device identifier (ID) for the device 100, an application identifier (ID) for an application 110 on the device 100, and a user identifier (ID). In other embodiments, other registration information may also be stored. In certain embodiments, the device 100 registers to receive push notifications for multiple applications, and, in such embodiments, the registration information includes an application identifier for each of the multiple applications.

In block 204, the backend application 180 sends a new message to the push service 130, where the new message is to be sent to the application 110 on the device 100. In block 206, the push service 130, in response to receiving the new message, determines whether a number of message records stored has been met. If so, processing continues to block 208, otherwise, processing continues to block 210. In block 208, the push service 130 deletes an existing message record from a table of a database 150. In other embodiments, a pre-configured number of existing messages may be deleted from one or more tables of the database 150. In block 210, the push service 130 creates a new message record in a table of a database for the new message with a message create time for the new message, a device identifier (ID) of the device 100 to receive the new message, an application identifier of the application 110 on the device 100 to receive the new message, the message content of the new message, and an indicator to indicate whether the new message has been picked up by the device 100. When the new message record is created, the indicator is set to indicate that the new message has not been picked up by the device yet. In certain embodiments, the create time indicates a time and a date (e.g., in milliseconds). In other embodiments, the create time may indicate a date or a time.

The following is an example message record:

```
{
  "messageId": "dsfhdsf343243dfde",
  "createdTime": "2017-06-19",
  "message" : "Discounts available today",
  "messagePickedUp" : "N"
}
```

Thus, embodiments attempt to ensure delivery of the message to the device 100 based on the retry count, the retry interval, and the number of message stored parameters.

Figure 3:
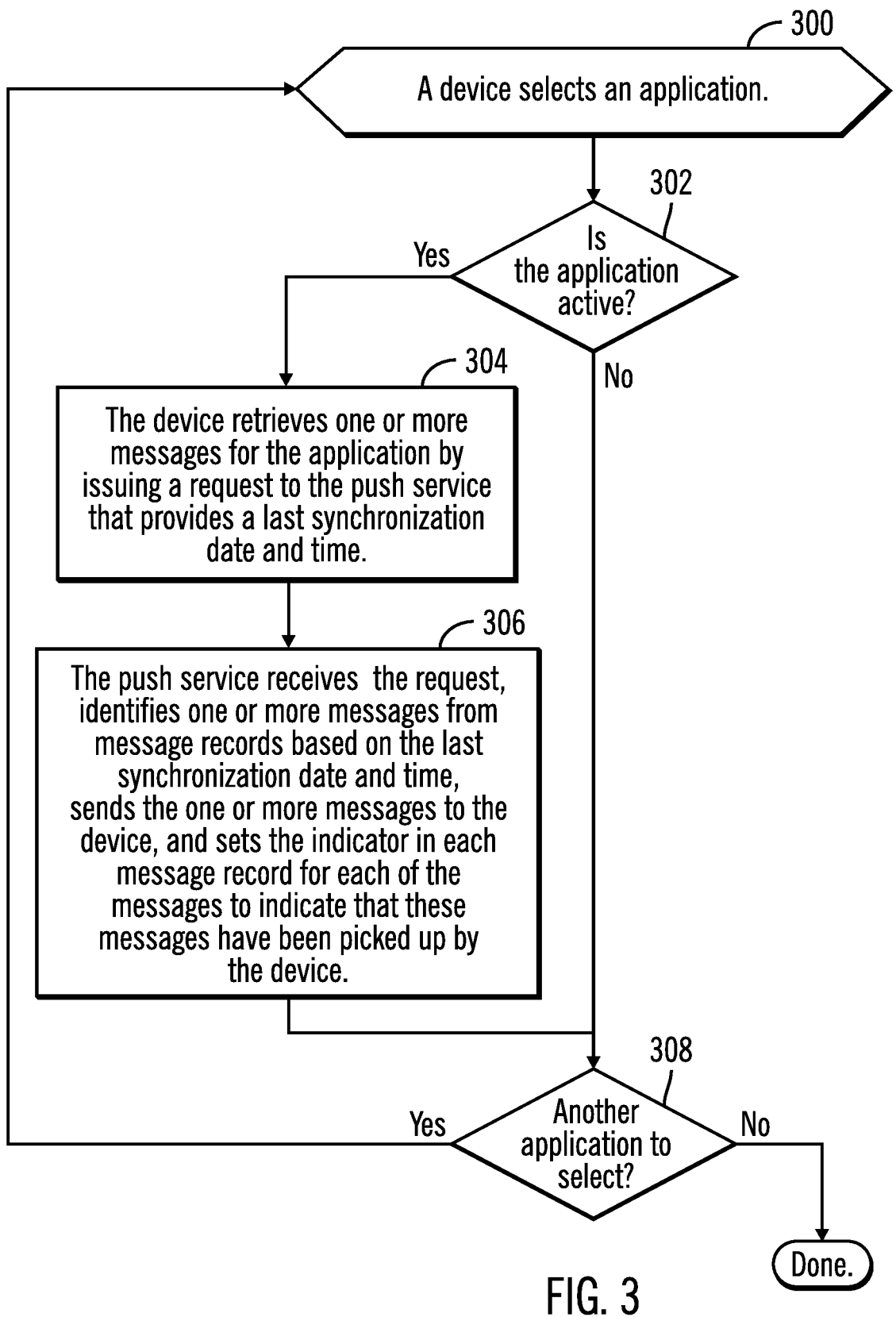
FIG. 3 illustrates, in a flowchart, operations for a device to retrieve messages in accordance with certain embodiments.

FIG. 3 illustrates, in a flowchart, operations for a device to retrieve messages in accordance with certain embodiments. Control begins at block 300 with the device 100 selecting an application 110 (from one or more applications). In block 302, the device 100 determines whether the application 110 is active. If so, processing continues to block 304, otherwise, processing continues to block 308. In block 304, the device 100 retrieves (e.g., fetches) one or more messages for the application 110 by issuing a request for the messages to the push service 130, where the request provides a last synchronization date and time (i.e., the last date and time at which the device 100 retrieved messages).

In block 306, the push service 130 receives the request, identifies one or more messages, from the message records, based on the last synchronization date and time, sends the one or more messages to the device 100, and sets the indicator in each message record for each of the messages to indicate that these messages have been picked up by the device 100. In particular, the push service 130 locates the messages by searching a table in the database 150 for message records for the device 100 that have a created time that is greater than or equal to the last sync date and time. In block 308, the device 100 determines whether there is another application 110 to select (from the one or more applications). If so, processing continues to block 300, otherwise, processing is done.

In certain embodiments, the device 100 retrieves messages per application 110. In other embodiments, the device 100 retrieves messages for the device and distributes the messages to different applications.

Figure 4:
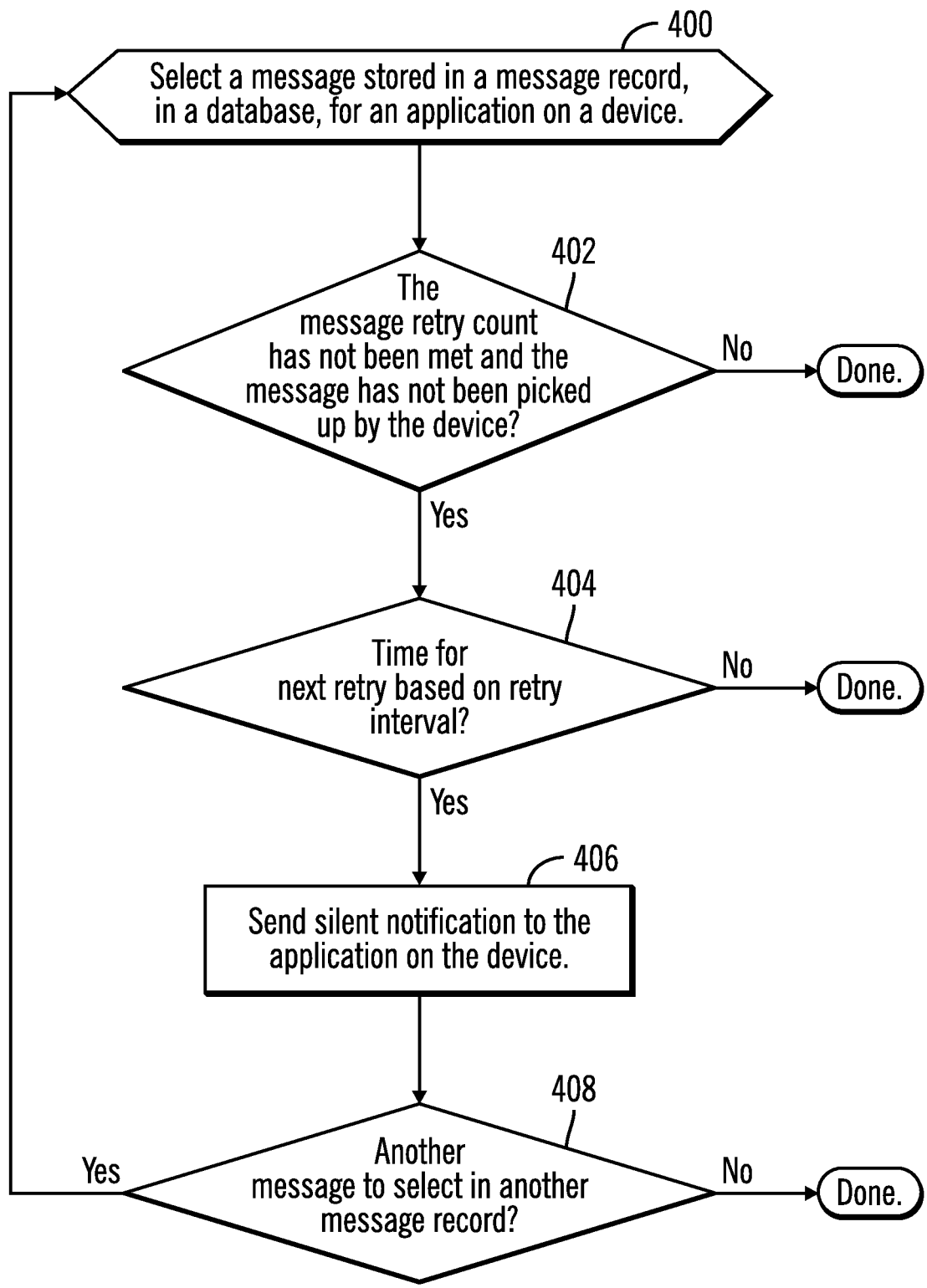
FIG. 4 illustrates, in a flowchart, operations for a push service to issue a silent push notification in accordance with certain embodiments.

FIG. 4 illustrates, in a flowchart, operations for a push service to issue a silent push notification in accordance with certain embodiments. Control begins at block 400 with the push service 130 selecting a message stored in a message record, in a database 150, for an application 110 on the device 100. In block 402, the push service 130 determines whether the message retry count has not been met and the message has not been picked up by the device 100. If so, processing continues to block 404, otherwise, processing is done for this message. The processing of FIG. 4 is periodically performed for each message stored in a message record in the database 150.

In block 404, the push service 130 determines whether it is time for a next retry based on the retry interval. If so, processing continues to block 406, otherwise, processing is done. In block 406, the push service 130 sends a silent notification to the application 110 on the device 100 to wake up the application 110 (i.e., to make the application 110 active). In block 408, the push service 130 determines whether there is another message to select in another message record. If so, processing continues to block 400, otherwise, processing is done.

Thus, if the application 110 is active, the device 100 fetches one or more messages for the application 110 from the server computer 120 by providing the last sync date and time to the push service 130 and automatically picks up the one or more messages targeted for the application 110 on the device 100 from the push service 130 using the application to database synchronization protocol. In other embodiments, the device 100 uses Representational State Transfer (REST) Application Programming Interfaces (APIs) provided by the push service 130. The push service 130 also updates the indicators for the messages to indicate that the messages have been picked up by the device 100.

In certain embodiments, if the application 110 is not active and the message is not picked up within the retry interval, the push service 130 sends a silent push notification to the application 110 on the device 100. Once the application 110 is active, the device 100 retrieves messages for the application 110. The push service 130 repeats sending the silent push notification at regular retry intervals until all the messages are marked as picked up on the database and the retry count has not expired.

In certain embodiments, the messages are delivered to the device 100 over a secure channel using other modes of security such as application secret, API keys, etc.

Thus, embodiments provide QoS ability by avoiding deletion of messages before they are picked up by the device 100. Also, with embodiments, when the application is inactive (offline), the push service 130 sends a silent notification to wake up the application (so that the application is active (online)). Moreover, with embodiments, when the application is active, the device 100 may request messages from the push service 130 for the application. Thus, by waking up the application, embodiments enable the application to obtain messages and avoid the loss of messages to be pushed to the application.

Figure 5:
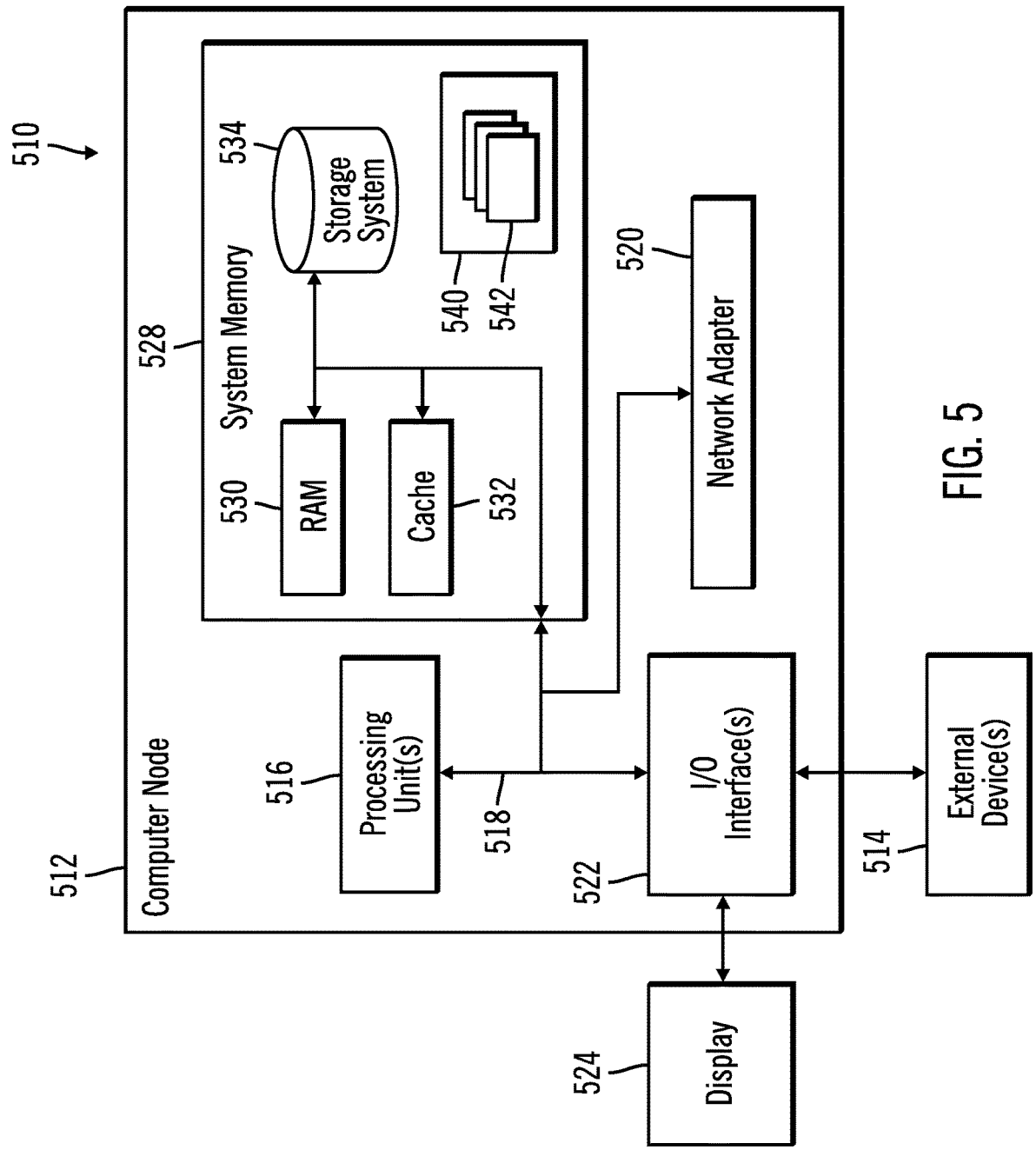
FIG. 5 illustrates a computing node in accordance with certain embodiments.

FIG. 5 illustrates a computing environment 510 in accordance with certain embodiments. In certain embodiments, the computing environment is a cloud computing environment. Referring to FIG. 5, computer node 512 is only one example of a suitable computing node and is not intended to suggest any limitation as to the scope of use or functionality of embodiments of the invention described herein. Regardless, computer node 512 is capable of being implemented and/or performing any of the functionality set forth hereinabove.

The computer node 512 may be a computer system, which is operational with numerous other general purpose or special purpose computing system environments or configurations. Examples of well-known computing systems, environments, and/or configurations that may be suitable for use with computer node 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 512 may be described in the general context of computer system executable instructions, such as program modules, being executed by a computer system. Generally, program modules may include routines, programs, objects, components, logic, data structures, and so on that perform particular tasks or implement particular abstract data types. Computer node 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer node 512 is shown in the form of a general-purpose computing device. The components of computer node 512 may include, but are not limited to, one or more processors or processing units 516, a system memory 528, and a bus 518 that couples various system components including system memory 528 to one or more processors or processing units 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 512 typically includes a variety of computer system readable media. Such media may be any available media that is accessible by computer node 512, and it includes both volatile and non-volatile media, removable and non-removable media.

System memory 528 can include computer system readable media in the form of volatile memory, such as random access memory (RAM) 530 and/or cache memory 532. Computer node 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, system memory 528 may include at least one program product having a set (e.g., at least one) of program modules that are configured to carry out the functions of embodiments of the invention.

Program/utility 540, having a set (at least one) of program modules 542, may be stored in system memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer node 512 may also communicate with one or more external devices 514 such as a keyboard, a pointing device, a display 524, etc.; one or more devices that enable a user to interact with computer node 512; and/or any devices (e.g., network card, modem, etc.) that enable computer node 512 to communicate with one or more other computing devices. Such communication can occur via Input/Output (I/O) interfaces 522. Still yet, computer node 512 can communicate with one or more networks such as a local area network (LAN), a general wide area network (WAN), and/or a public network (e.g., the Internet) via network adapter 520. As depicted, network adapter 520 communicates with the other components of computer node 512 via bus 518. It should be understood that although not shown, other hardware and/or software components could be used in conjunction with computer node 512. Examples, include, but are not limited to: microcode, device drivers, redundant processing units, external disk drive arrays, RAID systems, tape drives, and data archival storage systems, etc.

In certain embodiments, the device 100, the server computer 120, and/or the computer 170 each has the architecture of computer node 1012. In certain embodiments, the device 100, the server computer 120, and/or the computer 170 is part of a cloud infrastructure. In certain alternative embodiments, the device 100, the server computer 120, and/or the computer 170 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
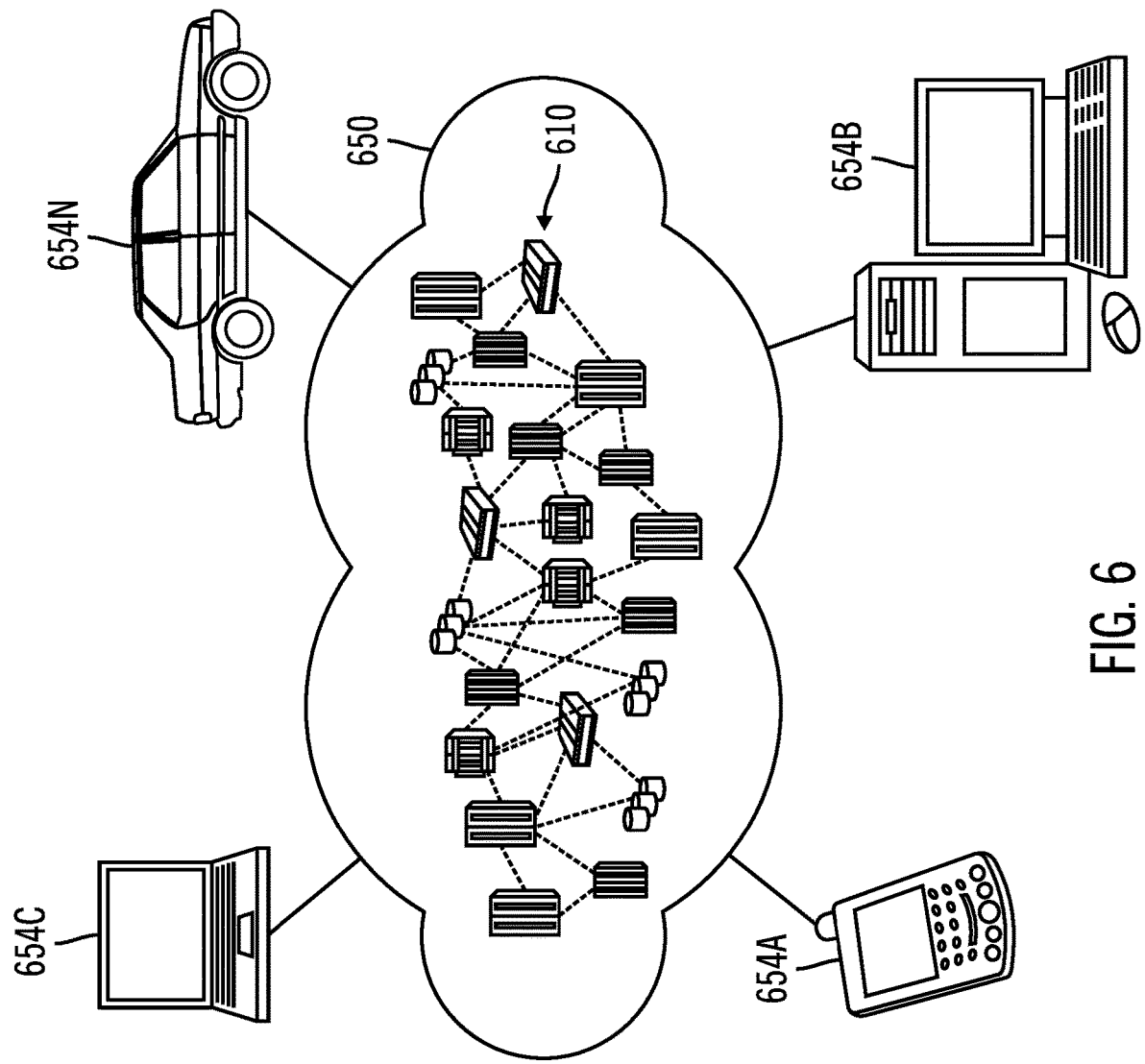
FIG. 6 illustrates a cloud computing environment in accordance with certain embodiments.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
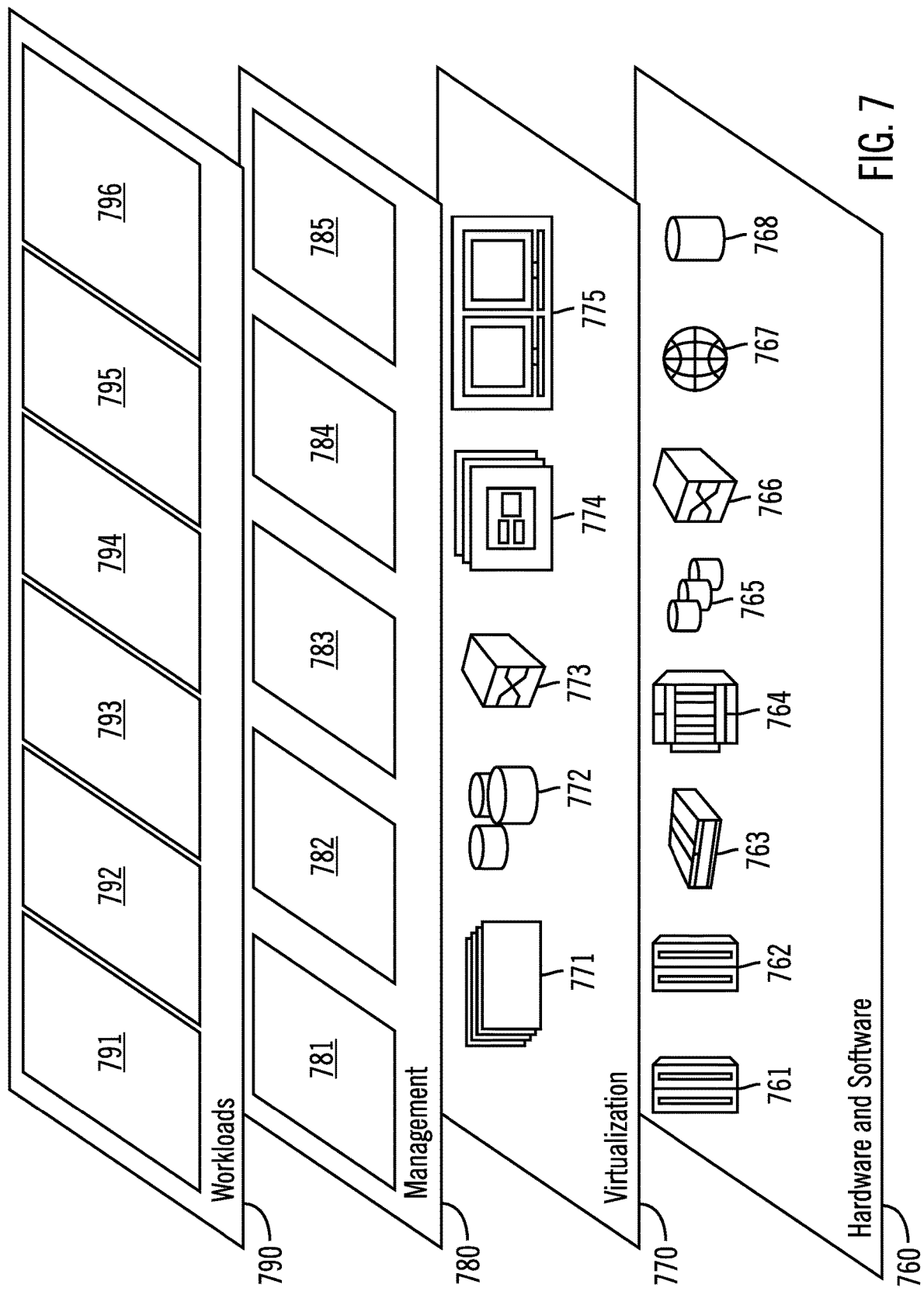
FIG. 7 illustrates abstraction model layers in accordance with certain embodiments.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and synchronizing a device using push notifications 796.

Thus, in certain embodiments, software or a program, implementing synchronizing a device using push notifications in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description provides examples of embodiments of the invention, and variations and substitutions may be made in other embodiments.

What is claimed is:
1. A computer-implemented method, comprising:
in response to receiving a request, from a device, to register to receive push notifications for a plurality of applications on the device, storing registration information;

for each of a plurality of messages, creating a message record in a table of a database with a device identifier, an application identifier of an application of the plurality of applications, message content of a message, and an indicator that indicates that the message has not been picked up by the device;
selecting a message from the plurality of messages;
determining that a message retry count for the message has not been met and the message has not been picked up by the device, wherein the message retry count specifies a number of hours within which the message is to be delivered to the device;
determining that it is time for a next retry based on a retry interval, wherein the retry interval specifies a time interval for sending silent push notifications when the message has not been picked up by the device;
in response to determining that the message retry count for the message has not been met, that the message has not been picked up by the device, and that it is time for the next retry, sending a silent push notification to the application on the device to wake up the application, wherein the application becomes active in response to the silent push notification, and wherein the device determines that the application is active and requests the message for the application; and
in response to receiving a request for one or more messages of the plurality of messages that specifies a last synchronization date and time;
sending the one or more messages to the device based on the last synchronization date and time; and
updating the indicator of each message record for the one or more messages to indicate that the one or more messages have been picked up by the device.

2. The computer-implemented method of claim 1, wherein the device registers with a push service to receive the push notifications, and wherein the device and the push service communicate using an application to database synchronization protocol.

3. The computer-implemented method of claim 1, wherein each of the plurality of messages is received from a backend application.

4. The computer-implemented method of claim 1, further comprising:
receiving a new message;
in response to determining that a number of message records stored has been met, deleting an existing message record from the table of the database; and
creating a new message record for the new message.

5. The computer-implemented method of claim 1, wherein a server computer executing a push service, the device, a computer executing a backend application, and the database are part of a cloud infrastructure.

6. A computer program product, the computer program product comprising a computer readable storage medium having program code embodied therewith, the program code executable by at least one processor to perform:
in response to receiving a request, from a device, to register to receive push notifications for a plurality of applications on the device, storing registration information;
for each of a plurality of messages, creating a message record in a table of a database with a device identifier, an application identifier of an application of the plurality of applications, message content of a message, and an indicator that indicates that the message has not been picked up by the device;
selecting a message from the plurality of messages;
determining that a message retry count for the message has not been met and the message has not been picked up by the device, wherein the message retry count specifies a number of hours within which the message is to be delivered to the device;
determining that it is time for a next retry based on a retry interval, wherein the retry interval specifies a time interval for sending silent push notifications when the message has not been picked up by the device;
in response to determining that the message retry count for the message has not been met, that the message has not been picked up by the device, and that it is time for the next retry, sending a silent push notification to the application on the device to wake up the application, wherein the application becomes active in response to the silent push notification, and wherein the device determines that the application is active and requests the message for the application; and
in response to receiving a request for one or more messages of the plurality of messages that specifies a last synchronization date and time;
sending the one or more messages to the device based on the last synchronization date and time; and
updating the indicator of each message record for the one or more messages to indicate that the one or more messages have been picked up by the device.

7. The computer program product of claim 6, wherein the device registers with a push service to receive the push notifications, and wherein the device and the push service communicate using an application to database synchronization protocol.

8. The computer program product of claim 6, wherein each of the plurality of messages is received from a backend application.

9. The computer program product of claim 6, wherein the program code is executable by the at least one processor to perform:
receiving a new message;
in response to determining that a number of message records stored has been met, deleting an existing message record from the table of the database; and
creating a new message record for the new message.

10. The computer program product of claim 6, wherein a server computer executing a push service, the device, a computer executing a backend application, and the database are part of a cloud infrastructure.

11. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
in response to receiving a request, from a device, to register to receive push notifications for a plurality of applications on the device, storing registration information;
for each of a plurality of messages, creating a message record in a table of a database with a device identifier, an application identifier of an application of the plurality of applications, message content of a message, and an indicator that indicates that the message has not been picked up by the device;
selecting a message from the plurality of messages;

determining that a message retry count for the message has not been met and the message has not been picked up by the device, wherein the message retry count specifies a number of hours within which the message is to be delivered to the device;

determining that it is time for a next retry based on a retry interval, wherein the retry interval specifies a time interval for sending silent push notifications when the message has not been picked up by the device;

in response to determining that the message retry count for the message has not been met, that the message has not been picked up by the device, and that it is time for the next retry, sending a silent push notification to the application on the device to wake up the application, wherein the application becomes active in response to the silent push notification, and wherein the device determines that the application is active and requests the message for the application; and in response to receiving a request for one or more messages of the plurality of messages that specifies a last synchronization date and time;

sending the one or more messages to the device based on the last synchronization date and time; and updating the indicator of each message record for the one or more messages to indicate that the one or more messages have been picked up by the device.

12. The computer system of claim 11, wherein the device registers with a push service to receive the push notifications, and wherein the device and the push service communicate using an application to database synchronization protocol.

13. The computer system of claim 11, wherein each of the plurality of messages is received from a backend application.

14. The computer system of claim 11, wherein the operations further comprise:

receiving a new message;

in response to determining that a number of message records stored has been met, deleting an existing message record from the table of the database; and creating a new message record for the new message.

15. The computer system of claim 11, wherein a server computer executing a push service, the device, a computer executing a backend application, and the database are part of a cloud infrastructure.

* * * * *